Sept. 16, 1930.  H. H. PATTON  1,775,828
BRAKE PEDAL PRESSURE GAUGE
Filed Dec. 22, 1926
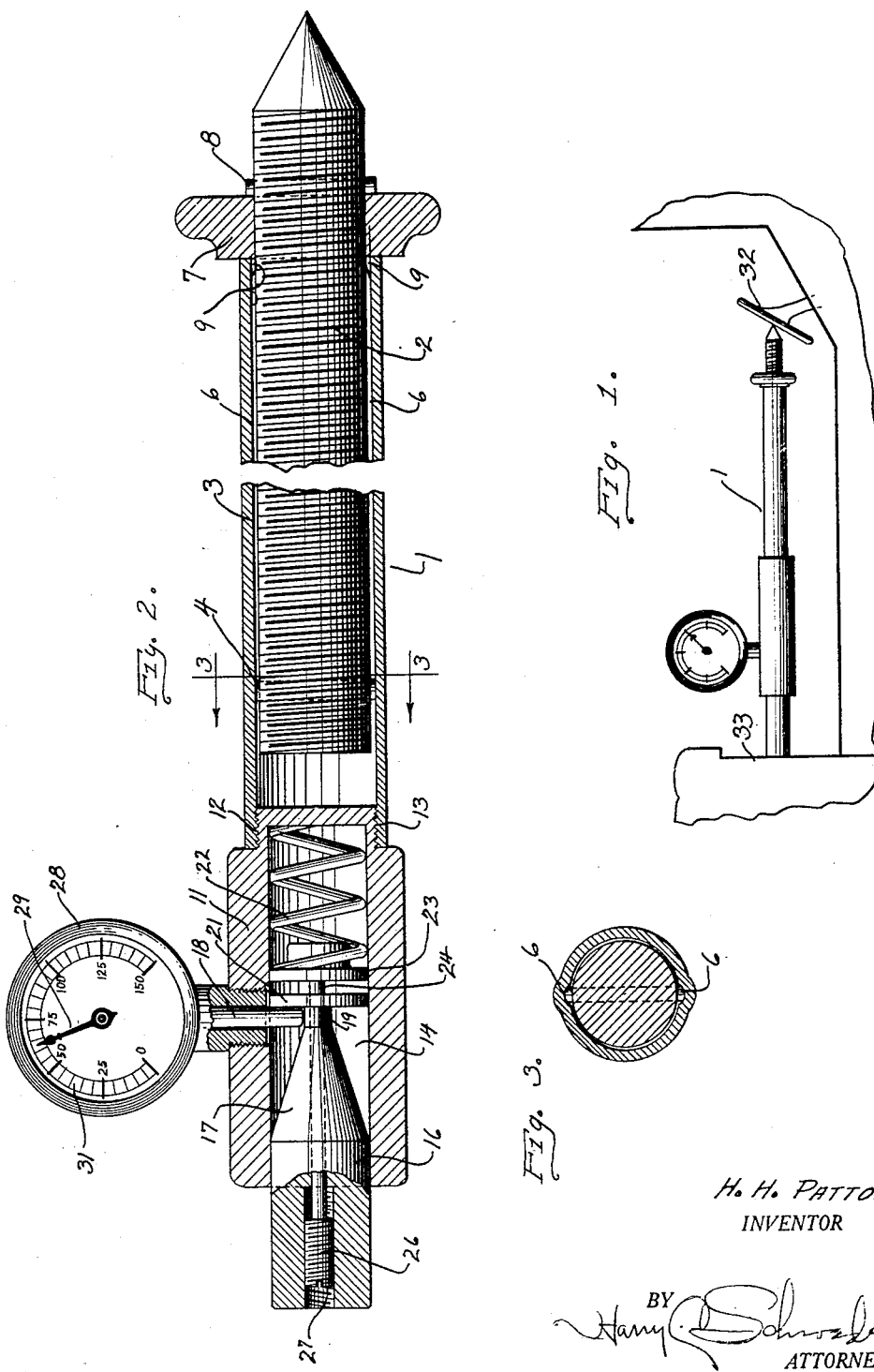
H. H. PATTON.
INVENTOR
BY Harry C. Schmelzer
ATTORNEY Patented Sept. 16, 1930

1,775,828

UNITED STATES PATENT OFFICE

HARRY H. PATTON, OF OAKLAND, CALIFORNIA, ASSIGNOR, BY MESNE ASSIGNMENTS, TO BRAKE-TESTING EQUIPMENT CORPORATION, A CORPORATION OF CALIFORNIA

BRAKE-PEDAL PRESSURE GAUGE

Application filed December 22, 1926. Serial No. 156,497.

The present invention relates to improvements in brake pedal pressure gauges, and its particular object is to provide a tool of the character described, by means of which it may be ascertained what pressure is necessary to be applied to the foot brake for setting the brakes of a motor vehicle. It is particularly proposed for this purpose to use an elongated element that may be inserted between the foot brake and a fixed portion of the motor vehicle as, for instance, the wall under the front seat in such a manner that the brake pedal may be depressed by extending the said member while a gauge is associated with the same which indicates the pressure necessary to accomplish the result. Further objects and advantages of my invention will appear as the specification proceeds.

The preferred form of my invention is illustrated in the accompanying drawing in which—

Figure 1 shows my device in side elevation as applied between the brake pedal and the front seat of an automobile.

Figure 2 a longitudinal section thru the device, and

Figure 3 a transverse section taken along line 3—3 of Figure 2.

While I have shown only the preferred form of the invention, I wish to have it understood that various changes or modifications may be made within the scope of the claims hereto attached without departing from the spirit of the invention.

In its preferred form, my device comprises an elongated element 1 corresponding in length substantially to the distance between the brake pedal and the front seat of a motor vehicle. The said element consists of a plurality of members and is made positively extensible by means of a threaded element 2 extending with freedom of longitudinal sliding motion into a sleeve 3, the threaded member being held against rotation within said sleeve by means of a transverse pin 4 extending thru the threaded member and into internal grooves 6 disposed in the wall of the sleeve. Endwise motion is imparted to the threaded member 2 by means of a nut 7 threaded thereon and bearing on the end of the sleeve. The nut is prevented from screwing off altogether by means of a pin 8. The rod or threaded element 2 may be held against removal form the sleeve by stopping one or both of the grooves 6 short of the end of the sleeve as shown at 9.

The cylindrical element 11 has its reduced end 12 threaded into the sleeve 3 as shown at 13 and forms a chamber 14 in which is slidably mounted a plunger 16 projecting beyond the remote end of the member 11 and formed, inside of said chamber, with a tapered face 17 allowing a transverse pin 18 to ride thereon. The tapered section of the plunger terminates, at its small end, in a cylindrical section 19 of small diameter on which the transverse member 18 normally rests and a disc 21 of the same diameter as the chamber which latter disc catches behind the transverse member 18 and thereby prevents the plunger from dropping out of the chamber and thus holds the same in an initial position. A spring 22 is mounted in the chamber in the back of the plunger and bears on a disc 23 which latter is held in adjustably spaced relation to the disc 21 by means of a pin 24 extending from the near end of the plunger and adapted to be adjusted by a turning motion of its threaded head 26 relative to the threaded bore 27 in the remote end of the plunger.

This particular construction has been selected to allow the plunger and the spring to be arranged in operative relation in an initial position while the spring is in a neutral condition, i. e., neither compressed nor extended. It will be seen that with the initial position of the plunger definitely established by the transverse member 18, it would be rather difficult to find a spring which would just fit in between the plunger and the rear wall of the chamber 14 without being under tension. When constructed as provided for in my device, a suitable spring approximately answering the requirements may be selected and inserted, and after positioning the plunger by means of the transverse member 18, definite cooperative relation between the plunger and the spring may be established by advancing the pin 24 so as to bear on the face of the disc 23 without placing the spring 22 under tension.

The transverse member 18 serves as the operating element for a gauge 28 which latter may be of any suitable construction and comprises an indicating hand 29 moving over a dial 31 when the transverse member 18 is actuated by the tapered face 17 of the plunger against the resistance of the spring 22.

The manner of using my brake testing tool is as follows: The tool is arranged in the manner indicated in Figure 1 between the brake pedal 32 and the wall 33 of the front seat of a motor vehicle, and is adjusted in length by turning of the nut 7 so that its length corresponds to the distance between the pedal and the front seat without placing the spring 22 under tension. The hand on the gauge will indicate zero at this time. The nut 7 is then turned for further extending the tool and for setting the brakes. When the brakes are completely set, which is determined by observation of the latter, the plunger 16 will have moved inwardly over the opposition of the spring 22 and the transverse member 18 will have been raised by the tapered surface 17 of the plunger so that now a different reading will be had on the gauge. This new reading will correspond to the pressure brought to bear on the spring 22 in setting the brakes and will, therefore, indicate what pressure is necessary to set the brakes which is the object aimed at in this invention.

It will be noted that in assembling the gauge holding portion of the device, the spring 22 with the disc 23 are first inserted. The plunger 16 is then positioned in such a manner that the disc 21 passes the place to be occupied by the transverse member 18 whereupon the gauge is threaded into the opening provided for the same. The transverse member 18 now will prevent the plunger 16 from dropping out of the chamber 14. By means of a screw driver, the threaded head 26 of the pin 24 is now turned until the latter pin makes contact with the disc 23 of the spring 22 without placing the latter spring under tension.

I claim:

1. A brake testing tool of the character described comprising an elongated extensible element for insertion between the brake pedal and a fixed part of a vehicle, said element including a telescoping section and an extensible section, positive means for extending the extensible section, means yieldably resisting contraction of the telescoping section and operable independently of the positive extending means, said telescoping section having a tapering member formed thereon, and indicating means mounted on the testing tool and arranged to be engaged and operated by the tapering member for registering the degree of contraction or movement of the telescoping section when the element is inserted between the brake pedal and a fixed part of a vehicle.

2. A brake testing tool of the character described comprising an elongated extensible element for insertion between the brake pedal and a fixed part of a vehicle, said element including an elongated telescoping section and an extensible section, positive means for extending the extensible section, means yieldably resisting contraction of the telescoping section and operable independently of the positive extending means, said telescoping section having a tapering member formed thereon, a member transverse to the telescoping section and slidably mounted on the testing tool to ride on the tapered member, and means operated by the transverse member for registering the degree of contraction or movement of the telescoping section when the element is inserted between the brake pedal and a fixed part of a vehicle.

3. A brake testing tool of the character described, comprising an elongated extensible element for insertion between the brake pedal and a fixed part of a vehicle, said element including a telescoping section and an extensible section, positive means for extending the extensible section, a spring yieldably resisting contraction of the extensible section and operable independently of the positive extending means, said telescoping section having a tapering member formed thereon, indicating means mounted on the testing tool and arranged to be engaged and operated by the tapering member for registering the degree of contraction or movement of the telescoping section when the element is inserted between the brake pedal and a fixed part of a vehicle, a pin slidably mounted on and carried by the telescoping section and having one end arranged to engage the spring, and a screw threaded into the telescoping section and arranged to engage the other end of the pin and adjustable to position the pin to vary the tension of the spring.

In testimony whereof I affix my signature.

HARRY H. PATTON.